United States Patent
Becker et al.

(10) Patent No.: US 9,235,454 B2
(45) Date of Patent: Jan. 12, 2016

(54) METHOD AND SERVER FOR GENERATING A DISPLAY AND OPERATING VIEW FOR AN OPERATING AND MONITORING DEVICE OF AN INDUSTRIAL AUTOMATION ARRANGEMENT

(71) Applicants: Norbert Becker, Erlangen (DE); Frank Froessler, Munich (DE); Raffaello Lepratti, Nuremberg (DE); Stefan Ritschel, Freudenberg (DE); Jan Rougoor, Eggenstein-Leopoldshafen (DE); Josef Schindler, Nuremberg (DE); Steffen Weber, Fuerth (DE)

(72) Inventors: Norbert Becker, Erlangen (DE); Frank Froessler, Munich (DE); Raffaello Lepratti, Nuremberg (DE); Stefan Ritschel, Freudenberg (DE); Jan Rougoor, Eggenstein-Leopoldshafen (DE); Josef Schindler, Nuremberg (DE); Steffen Weber, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 14/103,258

(22) Filed: Dec. 11, 2013

(65) Prior Publication Data

US 2014/0173637 A1    Jun. 19, 2014

(30) Foreign Application Priority Data

Dec. 18, 2012 (EP) .................................... 12197668

(51) Int. Cl.
*G06F 13/00* (2006.01)
*G06F 9/54* (2006.01)
*G05B 23/02* (2006.01)

(52) U.S. Cl.
CPC ............ *G06F 9/542* (2013.01); *G05B 23/0272* (2013.01)

(58) Field of Classification Search
CPC .... G06F 9/542; G06F 9/546; H04L 29/08072
USPC .................................. 719/313, 318; 709/224
See application file for complete search history.

(56) References Cited

U.S. PATENT DOCUMENTS

| 2006/0095177 | A1  | 5/2006  | Donk et al. |
|---|---|---|---|
| 2010/0082669 | A1* | 4/2010  | Obitko et al. ................. 707/770 |
| 2011/0283239 | A1* | 11/2011 | Krishnan et al. .............. 715/853 |
| 2012/0036397 | A1* | 2/2012  | Balani et al. ............... 714/38.11 |
| 2012/0124647 | A1* | 5/2012  | Simula et al. ..................... 726/4 |
| 2014/0244823 | A1* | 8/2014  | Cornett et al. ................ 709/223 |

FOREIGN PATENT DOCUMENTS

| DE | 102005030361    | 3/2006  |
|---|---|---|
| DE | 202012009024 U1 | 11/2012 |
| EP | 1195664         | 4/2002  |
| WO | WO 2012051726 A1 | 4/2012 |

* cited by examiner

*Primary Examiner* — Andy Ho
(74) *Attorney, Agent, or Firm* — Cozen O'Connor

(57) ABSTRACT

A method and a server for generating a display and operating view for an operating and monitoring device of an industrial automation arrangement, wherein after an event has been logged, information relating to the event and details of the identity or role of a user of the operating and monitoring device are transmitted to an entity, after which planned information relating to at least one component of the industrial automation arrangement affected by the event is retrieved from an engineering database using the event and specifically for the identity or role of the user, current state information is also retrieved from the at least one affected component, and finally the planned information and the state information is used to generate the display and operating view such that, the display and operating images are advantageously set up and activated in an event-controlled manner.

9 Claims, 1 Drawing Sheet

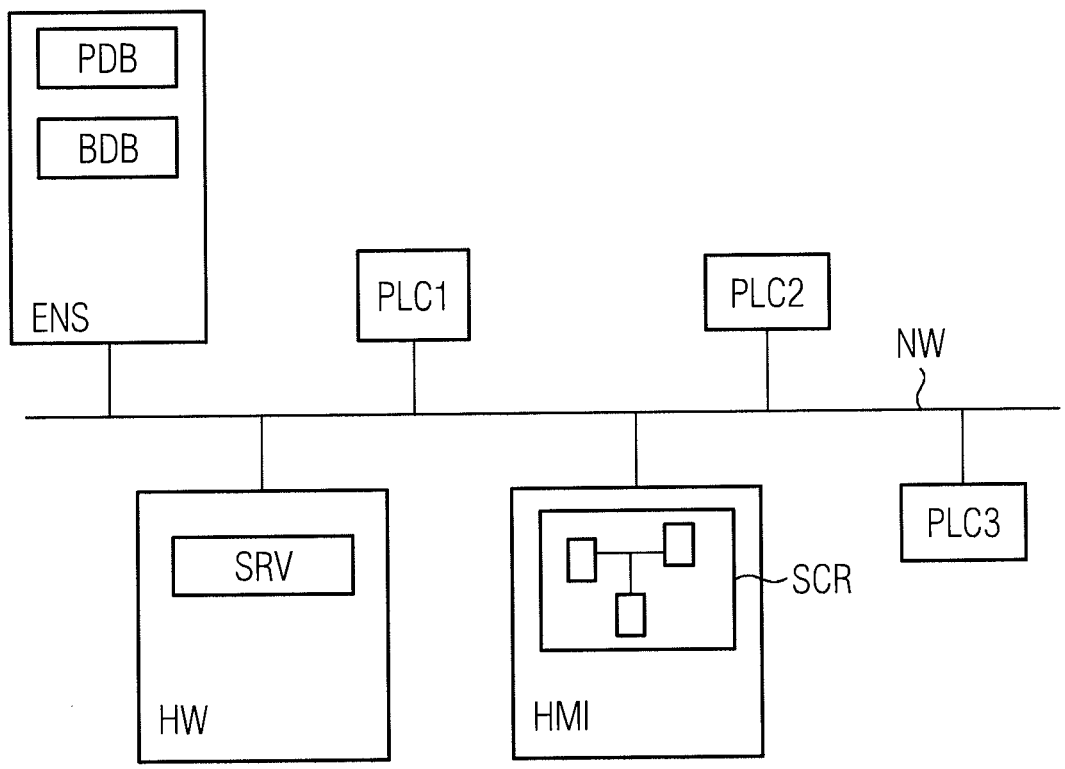

METHOD AND SERVER FOR GENERATING A DISPLAY AND OPERATING VIEW FOR AN OPERATING AND MONITORING DEVICE OF AN INDUSTRIAL AUTOMATION ARRANGEMENT

BACKGROUND OF THE INVENTION

1. Field of the Invention

The invention relates to a method and server for generating a display and operating view for an operating and monitoring device of an industrial automation arrangement.

2. Description of the Related Art

Industrial automation arrangements usually consist of a multiplicity of components, such as microprocessor-controlled controllers, Programmable Logic Controller (PLC), sensors or actuators. In this case, the microprocessor-controlled controllers are usually connected to one another via a data network (automation network), such as via a Profinet, Profibus, industrial Ethernet or similar network. Operating and monitoring devices may also usually or occasionally be connected to the automation network, these devices indicating information relating to the states of the controlled process or the controlled automation task to the operating personnel or a maintenance engineer using a graphical user interface and providing operating elements that can be used to control the system or input instructions or parameters. Such operating and monitoring devices, which are often also referred to as HMI devices (HMI=Human Machine Interface), may be both available in a permanently installed manner at different workstations of an automation arrangement and carried by an operator as mobile devices, which are often even wirelessly operated, or occasionally "plugged" into particular devices or network connections ("ports") of the automation arrangement.

The industrial automation arrangements are usually planned and programmed using an "engineering system", which means that both the arrangement and (electrical) connection of the components (planning) and the creation of the software for the microprocessor-controlled components (programming) are performed using the engineering system and the programs (tools) present in the engineering system. In addition to programming the microprocessor-controlled components (PLCs), programs for the operating and monitoring devices are also created during planning and programming. The graphical user interfaces ("screens") of the operating and monitoring devices, in particular, are defined in this case. This means that particular views ("screens") are provided for each of these devices and, in some embodiments, also separately for different users (operating personnel, maintenance personnel, application specialists or quality assurance), which each symbolically represent a number of components, their relationships to one another and their states. These "screens" usually also comprise operating elements (for example, buttons or input fields) for operating or influencing the components and the automated process. If necessary, an operator or a user of an operating and monitoring device may call one of the prepared "screens" and may thus procure the desired information or make the desired inputs. The "screens" shall generally also be referred to as "display and operating views" below.

A corresponding "HMI project" for the automation arrangement is created on a machine or a production plant during engineering for each operating and monitoring device to provide the necessary information and operating elements in the form of "GUI objects" (GUI=Graphical User Interface) for the different users. This "HMI project" is static in this case, which means that it is already necessary to consider in advance what production events may occur and for which users or user roles it is intended to accordingly react to these events in what manner. During ongoing operation, an operator must then start an "HMI project" assigned to the plant or machine to gain access to the "screens" prepared for him and his function ("role").

The disadvantage here is that, in the event of changes to the structure of the industrial automation arrangement, the "HMI project" must also be regularly changed to adapt the "screens" prepared therein to the changed conditions.

SUMMARY OF THE INVENTION

It is therefore an object of the present invention to improve and simplify the creation and updating of display and operating views ("screens") of operating and monitoring devices for industrial automation arrangements.

This and other objects and advantages are achieved in accordance with the invention in that, instead of or in addition to the "advance creation" of the "static" display and operating views, the "static" display and operating views are dynamically generated in an event-oriented and context-based and role-based manner and are visualized on operating and monitoring devices (HMI devices). For this purpose, the invention provides for an "entity" (server, procedure or device) to be provided for the purpose of evaluating event-controlled queries from ongoing operation, where the queries are evaluated in a context-based manner, i.e., based on the type of triggering event, the respective plant state, the state of ongoing production or the ongoing process and based on the device which triggered the event, and where required contents are intended to be compiled in an operator-role-specific manner from a central engineering database.

It is also an object to provide a method for generating a display and operating view for an operating and monitoring device of an industrial automation arrangement, where information relating to states of the industrial automation arrangement and operating elements for influencing components of the industrial automation arrangement is compiled for output on a graphical user interface. In this case, after an event has been logged, information relating to the event and details of the identity or role of a user of the operating and monitoring device are transmitted to an entity, after which the entity, in a first step, retrieves planned information relating to at least one component of the industrial automation arrangement affected by the event from an engineering database using the event and specifically for the identity or role of the user, in a second step, retrieves current state information from the at least one affected component or another data source, and, in a third step, uses the planned information and the state information to generate the display and operating view. The resultant dynamic automated compilation of machine and plant operation can be used during productive operation, monitoring and optimization, and during servicing. In this case, the display and operating images ("screens") are advantageously set up and activated in an event-controlled manner. These events may be triggered by an operator on the "HMI device" (operating and monitoring device), by the machine/plant and the components themselves installed in the latter or else by superimposed processes, such as Manufacturing Execution System (MES), or Enterprise Resource Planning (ERP).

The object of the invention is also achieved by a server having an entity for generating a display and operating view, where a server for generating a display and operating view for an operating and monitoring device of an industrial automation arrangement is provided in which, the server is configured to provide and arrange information relating to states of the industrial automation arrangement and to provide and arrange operating elements for influencing components of the industrial automation arrangement for output on a graphical user interface. In this case, the server is configured to interchange data and information with at least one component of the industrial automation arrangement, an operating and monitoring device and an engineering database with structured details of the components and their spatial and/or logical relationships, where the server is configured to receive messages with information relating to at least one event and to receive details of the identity or role of a user of the operating and monitoring device, after which the server is configured to perform a first step in which planned information relating to at least one component of the industrial automation arrangement affected by the event is retrieved from the engineering database using the event and specifically for the identity or role of the user, a second step in which current state information is retrieved from the at least one affected component or another data source, and a third step in which the planned information and the state information is used to generate the display and operating view. The advantages already discussed in connection with the method can be achieved via such a server having such an entity which may be formed, for example, by software running on any desired data processing device (hardware) and need not necessarily have its own separate server hardware.

Symbols for a plurality of components affected by the event and their logical or spatial relationship with respect to one another are advantageously displayed in the display and operating view ("screen"), with a suitable entry point being able to be the component directly affected by the event or the component closest to the HMI device used. For this purpose, a number of spatially or logically adjacent components can then be provided for display. Depending on the available display area, all relevant "neighbors" or only the most relevant neighbors are displayed. In this regard, a user can also provide his own specifications with respect to the degree of desired detail and the preferred type of display.

When displaying the spatial relationships, a view may be formed thereby, which view reminds the user of the actual arrangement of the components or devices and thus facilitates troubleshooting on components such as hardware. As a result of the display of the logical relationships, it is advantageous that an information flow, energy flow, material flow or functional dependences of the components on one another can be visualized, for example. In one particularly advantageous embodiment, it is possible to change over between the display of logical relationships and the display of spatial relationships. In this case, the situation may occur in which other components are each at least partially displayed when changing over between logical and spatial relationships because spatially adjacent components, for example, do not necessarily have to be in a logical relationship with the component under consideration which has triggered the event, for example, and vice versa. Depending on the information which can be contributed by an engineering system, either a data flow, a material flow, an energy flow or other dependences can be viewed with respect to the logical view, for example. If the components are arranged in a three-dimensional manner, for example, different levels or sections (for example, horizontal section or vertical section) or the like can be selected with respect to the display of the spatial relationships. Here, the components may preferably be represented by associated symbols that may simultaneously also comprise display means for states. In another embodiment, the components or devices may also be displayed in a photorealistic view.

In order to trigger the dynamic set-up of a display and operating view, events of different types may be provided, where a plurality of different events are also able to be advantageously provided at the same time. In one particularly advantageous embodiment, the occurrence of exception states, for example the exceeding or undershooting of limit values, or the occurrence of errors may be used to "trigger" the compilation and output of a display and operating page. In this case, that component or plant part at which the event has occurred or been logged is advantageously intended to be necessarily displayed using a display and operating view, the components which are spatially or logically "adjacent" or related, for example, likewise being displayed depending on the content of the information then retrieved from the engineering database. The fact that an engineering database is respectively accessed in real time results in the advantage that the current planning data and therefore data best reflecting reality are always accessed.

Another common event for triggering the generation of the display and operating view involves activating the operating and monitoring device or linking it to the data network (automation network). In this respect, the respective location of the operating and monitoring device, which may emerge from a designation or item of technical information relating to the network access respectively used (LAN connection or WLAN cell), can be used to select that component or those components which is/are to be displayed using the display and operating view. In addition to identification using the location of the network access, absolute determination of the geographical location of the operating and monitoring device, such as using a GPS receiver, or else a spatial position relative to other existing components can also be used to select the components to be displayed.

An important aspect of one advantageous embodiment involves a user-dependent or user-role-dependent selection of the components to be displayed and the selection of the information to be displayed. This makes it possible, for example, to display more detailed information to an expert and to provide operating elements which have more comprehensive authorizations than an operator who can be presented with only restricted information and only restricted operating elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

An exemplary embodiment of the method according to the invention is explained below using the drawing; this is simultaneously used to explain a server according to the invention.

In this case, the drawing schematically shows an arrangement of a plurality of components of an automation arrangement, a server according to the invention and an operating and monitoring device.

DETAILED DESCRIPTION OF THE PREFERRED EMBODIMENTS

The FIGURE schematically illustrates an automation network NW (network for short) which is in the form of an industrial Ethernet, for example. The components PLC1, PLC2, PLC3 which, in this exemplary embodiment, are intended to be programmable logic controllers each having a microprocessor, memory etc. and being provided with peripherals (not illustrated) in the form of sensors, actuators or the like are connected to the network. An operating and monitoring device HMI (Human Machine Interface) having a graphical user interface which is used to display states of the automation arrangement and, in particular, of the components PLC1, . . . , PLC3 and of the automation operations and processes monitored or controlled thereby is also connected to the network NW. The graphical user interface also has operating elements which can be used to make inputs for the components PLC1, . . . , PLC3 and other devices. The operating elements and the display elements are combined on display and operating views SCR ("screens" or "operating pages"), different display and operating views SCR being intended to be able to be displayed depending on the requirements and depending on the user and situation.

Standard-compliant hardware HW, for example, in the form of server hardware in the industry standard, is also connected to the network NW, an entity SRV (also referred to as "server") being installed on this server hardware HW. In addition, further server hardware ENS (engineering system) is also connected to the network NW and comprises a project database PDB and a user database BDB in addition to further functional modules (not illustrated). Both the server hardware HW and the server hardware ENS can also be arranged in other networks which are connected to the network NW under consideration here via a gateway; in particular, the server hardware HW, ENS may also be communicatively connected to the network NW via the Internet or a dedicated data connection.

The dynamic set-up of a display and operating view SCR shall be described below, in which case, after a triggering event, the display and operating view SCR is configured by the entity SRV, is transmitted, using the network NW, to the operating and monitoring device HMI and is output or displayed there on the graphical user interface.

The activation ("switching-on", "starting", etc.) of the operating and monitoring device HMI inside the industrial automation arrangement is intended to be deemed a triggering event here, in which case it is intended to be assumed here that the operating and monitoring device HMI is a wirelessly operated device (WLAN device) and the industrial automation arrangement consists of a multiplicity of WLAN cells which are each assigned to a particular production area, and in which case the WLAN subnetwork (cell) respectively used allows a conclusion as regards the processing station of the industrial automation arrangement at which the user of the operating and monitoring device HMI is currently located. In alternative embodiments, other events can also be used to "trigger" the creation of the display and operating view SCR, in particular also exception states (errors, alarms etc.) in one of the components PLC1, . . . , PLC3.

It is assumed below that a user activates his operating and monitoring device HMI in that WLAN cell in which the component PLC2 is also arranged. It is also assumed that the user "logged" onto the operating and monitoring device HMI is a network specialist. For this purpose, the user has logged onto the operating and monitoring device HMI and has authorized himself using his username and a password.

The operating and monitoring device HMI sends a query message to the entity SRV via the WLAN network (not illustrated) which is assumed to be communicatively connected to the network NW, the query message comprising the user identifier of the user (network specialist) logged on and a detail of the WLAN cell, such as an SSID (Service-Set Identifier). In reality, a query message will comprise a multiplicity of further items of information; only those message parts which are significant to the function of the method described are discussed at this point.

The entity SRV or a procedure programmed in the SRV processes the query message and retrieves further information from the engineering system ENS or the databases included in the ENS, i.e., the user database BDB and the planning database PDB.

In a first step, the user who has logged on is verified by using the username to retrieve a user profile from the user database BDB. In this case, it is assumed that, in addition to a multiplicity of further items of information, the information relating to the fact that the user logged on is a network specialist who also has the authorization to view and change network configurations and network parameters of all components and devices arranged in the network NW is retrieved from the user database BDB. The user data also contain, in coded form, the fact that this logged-on user prefers a "network view" for an operating and monitoring device HMI, i.e., a view in which the existing components PLC1, . . . , PLC3, HW, ENS, HMI are displayed as simple symbols ("black boxes") and the network connections of these devices, including the fundamental network parameters, such as IP addresses, are to be displayed.

After this information from the user profile has been evaluated, the server SRV retrieves further data from the project database PDB. The designation of the WLAN cell (SSID) in which the operating and monitoring device HMI is currently located is initially used to determine the current location of the operating and monitoring device HMI within the industrial automation arrangement. For this purpose, the area containing the industrial automation arrangement is subdivided into spatial sectors ("clusters"), with the result that the sector in which the identified WLAN cell is located can be used in the present exemplary embodiment to determine that the component PLC2 is located in the same sector. This can be determined, for example, by virtue of the server SRV initially determining the sector containing the operating and monitoring device HMI using the identifier (SSID) of the WLAN cell in question. For this purpose, it is assumed that the assignment of WLAN cells and their designation (SSID) and the corresponding sectors is stored in the project database PDB or alternatively in a separate location database. A list of all components from the same sector is now retrieved from the project database PDB using the sector determined; this is only the component PLC2 in the present simplified exemplary embodiment.

In order to set up a display and operating view, the component PLC2 is therefore centrally displayed, after which the information relating to which other components interchange data with the component PLC2 is retrieved from the project database PDB or the "network view" stored in the project database. In this case, it should be noted that, although the component PLC2 is actually able to interchange data with all further devices and components of the network NW via the network NW and, if a suitable gateway is present, to also interchange data via the gateway, it is of interest to the logged-on user to which other components the component PLC2 is actually intended to transmit data and from which other components and devices this component PLC2 is intended to receive data during productive operation.

It is assumed that the component PLC2 is the control device for a robot arm which is intended to receive, from the component PLC1, here a conveyor, for example, data relating to when an object to be manipulated using the robot arm is available on the conveyor. Not only the component PLC2 but also the component PLC1 are therefore affected by the event, i.e., the activation of the operating and monitoring device HMI, with the result that both components PLC1, PLC2 should be displayed on the display and operating view SCR. In addition, the logical data connection between these two components PLC1, PLC2 must also be visualized, in which case, the current communication parameters, in particular IP addresses or network protocols, are also displayed as state information on the display and operating view on account of the fact that the querying user is a network specialist. These are retrieved "online" from the components PLC1, PLC2. On account of his extended authorization, the user is also provided with operating elements for changing the parameters and network settings. In one embodiment, these operating elements may be inserted or masked via a command from the user.

In a further step, additional state information is now retrieved from the components PLC2, PLC1 to be displayed. For this purpose, information relating to retrievable variables and parameters of the components PLC2, PLC1 found and details of the type of visualization of these variables and parameters are retrieved from the project database PDB. The server SRV, i.e., the processing entity, uses this information to retrieve the corresponding values from the components PLC2, PLC1 and visualizes them in the direct vicinity or on the symbols for the associated components PLC2, PLC1. Any active, operational network interface may thus be represented by a green dot or the like for the "network view" displayed here, for example, whereas impaired network connections are visualized via a red symbol or the like. A percentage utilization or an operating temperature or another parameter may be displayed in a physical view, for example. If a plurality of roles are allocated to a user in his user profile because he is a network specialist and a mechatronics engineer at the same time, for example, the corresponding user may be provided, in one embodiment, with a selection possibility, according to which he can choose between a network view, a physical/technical view, a commercial view (for example, with component-based production statistics and the like).

In addition, it is also possible for state information relating to a component PLC1, . . . , PLC3 to also be retrieved or to only be retrieved from an external device, such as a statistics server. This is then accordingly administered in the project database based on the affected component.

If the user had been another specialist, such as a mechatronics engineer, the affected components would have been displayed in a different manner, i.e., in a "physical" view, i.e., in the example of the robot, a unit having a plurality of motors, rotation angle sensors and the like. Instead of possibly the conveyor which is controlled by the component PLC1, the component PLC3 which may be, for example, a processing station into which the robot arm (component PLC2) must insert a workpiece would have possibly been alternatively or additionally displayed as the "adjacent" component, i.e., the component that is likewise affected and therefore must be displayed. In such a case, no operating elements for influencing network addresses and the like would accordingly have been displayed, but rather other operating elements for configuring the movement speed of the robot arm or the like.

The dynamic, automated compilation of machine and plant operation that is thus possible can therefore be used both during productive operation (monitoring and optimization) and during servicing. In this case, the display and operating views SCR are set up and activated in an event-controlled manner. These events may be triggered by an operator on the operating and monitoring device HMI, by the machine/plant or by the components PLC1, . . . , PLC3 themselves arranged in the machine/plant or else by superimposed processes (not illustrated here). If a fault occurs in the automation arrangement and therefore in one of the components, for example, the entity SRV or a procedure programmed in the SRV is informed of this disruptive event with corresponding features. The procedure included in the entity SRV then checks employee availability, such as using available user profiles, and can therefore also alert a suitable specialist. At the same time, the necessary contents, such as operating instructions, video instructions for fault clearance, process images or network views, are dynamically compiled.

The appropriate information for fault clearance is therefore transferred to the operating and monitoring device HMI and therefore to the corresponding operator for visualization. It is also possible, for example, in the case of falling product quality that is determined by corresponding sensors and measuring tools, to trigger a process monitoring and optimization event in situ on the request of a plant operator. The display and operating concept then dynamically provides images ("screens") with relevant machine settings, material parameters, process intervention possibilities, KPIs (Key-Performance Indices) in a location-dependent and situation-dependent manner and in a manner tailored to the qualification and authorization of the plant operator.

As a result of the described automatic and dynamic compilation and generation of the visualization ("display and operating views") for operating and monitoring devices HMI, the amount of engineering is drastically reduced because modifications to individual "HMI projects" no longer have to be processed or inserted in the event of interim changes to a project or to the automation device. As a result of the fact that the server having the entity SRV that configures the display and operating views SCR is connected to a central engineering database, it is ensured that up-to-date data are always consistently used for the visualization. The user-oriented visualization that is possible as a result of the concept increases the operability and reduces the likelihood of operating errors. In one advantageous embodiment, it is also possible to integrate three-dimensional objects into the visualization on a case-by-case basis and therefore to further increase the operation intuitiveness.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for generating a display and operating view for an operating and monitoring device of an industrial automation arrangement, information relating to states of the industrial automation arrangement and operating elements for influencing components of the industrial automation arrangement being compiled for output on a graphical user interface, the method comprising:
   transmitting information relating to an event and details of an identity or role of a user of the operating and monitoring device to an entity after the event has been logged;
   retrieving, by the entity after the event has been logged, planned information relating to at least one component of the industrial automation arrangement affected by the event from an engineering database using the event and specifically for the identity or role of the user;
   retrieving, by the entity after the event has been logged, current state information from or via the at least one affected component; and
   utilizing, by the entity after the event has been logged, the planned information and the information relating to states of the industrial automation arrangement to generate the display and operating view.

2. The method as claimed in patent claim 1, wherein symbols for a plurality of components affected by the event and their logical or spatial relationship with respect to one another are displayed in the display and operating view.

3. The method as claimed in claim 1, wherein the event comprises an occurrence of an exception state in at least one of the components of the industrial automation arrangement.

4. The method as claimed in claim 3, wherein the exception state is detected when monitoring at least one parameter of a component of the industrial automation arrangement, a message being sent to the entity upon the occurrence of the exception state, the message comprising a detail for identifying a relevant component and an item of information relating to a designation and a value of the relevant parameter.

5. The method as claimed in patent claim 4, wherein the exception state comprises one of an occurrence of a malfunction and a deviation of a measured value from a desired value.

6. The method as claimed in patent claim 1, wherein the event comprises one of an input of a query command on the operating and monitoring device and an activation of the operating and monitoring device.

7. The method as claimed in patent claim 1, wherein an absolute location of the operating and monitoring device or a location of the operating and monitoring device relative to at least one component of the industrial automation arrangement or a designation of an access to a data network, to which the operating and monitoring device is or has been linked, is used as the information relating to the event.

8. The method as claimed in patent claim 1, wherein a component at which or in a spatial or logical vicinity of which the event occurs, and at least one further component, which is spatially or logically or factually related to a first component according to the planned information, are used as the components affected by the event.

9. A server for generating a display and operating view for an operating and monitoring device of an industrial automation arrangement, the server comprising:
   an entity configured to provide and arrange information relating to states of the industrial automation arrangement and to provide and arrange operating elements for influencing components of the industrial automation arrangement for output on a graphical user interface;
   wherein the server is configured to interchange data and information with at least one of (i) at least one component of the industrial automation arrangement, (ii) the operating and monitoring device and (iii) an engineering database with structured details of the components and at least one of their spatial relationships and logical relationships;
   wherein the server is further configured to receive messages with information relating to at least one event and to receive details of the identity or role of a user of the operating and monitoring device, after which the server is further configured to:
   retrieve planned information relating to at least one component of the industrial automation arrangement affected by the event from the engineering database using the event and specifically for the identity or role of the user;
   retrieve current state information from the at least one affected component; and
   generate the display and operating view from the planned information and the state information.

* * * * *